(12) United States Patent
Wang et al.

(10) Patent No.: US 12,326,370 B2
(45) Date of Patent: Jun. 10, 2025

(54) TEMPERATURE SENSING DEVICE

(71) Applicant: ORIENTAL SYSTEM TECHNOLOGY INC., Hsin-Chu (TW)

(72) Inventors: Chein-Hsun Wang, Hsin-Chu (TW); Ming Le, New Taipei (TW); Tung-Yang Lee, Hsinchu County (TW); Yu-Chih Liang, Hsinchu (TW); Wen-Chie Huang, Hualien County (TW); Chen-Tang Huang, Hsinchu County (TW); Jenping Ku, Hsinchu County (TW)

(73) Assignee: ORIENTAL SYSTEM TECHNOLOGY INC., Hsin-Chu (TW)

( * ) Notice: Subject to any disclaimer, the term of this patent is extended or adjusted under 35 U.S.C. 154(b) by 504 days.

(21) Appl. No.: 17/970,539

(22) Filed: Oct. 20, 2022

(65) Prior Publication Data

US 2024/0133745 A1  Apr. 25, 2024
US 2024/0230414 A9  Jul. 11, 2024

(51) Int. Cl.
*G01J 5/07* (2022.01)
*G01J 5/14* (2006.01)

(52) U.S. Cl.
CPC .. *G01J 5/07* (2022.01); *G01J 5/14* (2013.01)

(58) Field of Classification Search
None
See application file for complete search history.

(56) References Cited

U.S. PATENT DOCUMENTS

| | | | | |
|---|---|---|---|---|
| 3,091,693 | A | * | 5/1963 | Rudomanski ........... G01J 5/602 |
| | | | | 250/350 |
| 8,834,019 | B2 | * | 9/2014 | Fraden .................... G01J 5/061 |
| | | | | 374/208 |
| 2014/0291527 | A1 | * | 10/2014 | Okudo .................. G01J 5/0025 |
| | | | | 250/353 |
| 2016/0282194 | A1 | * | 9/2016 | Barnett .................. H10N 10/01 |
| 2022/0316951 | A1 | * | 10/2022 | Le .......................... G01K 7/015 |

* cited by examiner

*Primary Examiner* — Edwin C Gunberg
(74) *Attorney, Agent, or Firm* — Chun-Ming Shih; HDLS IPR SERVICES

(57) ABSTRACT

A temperature sensing device includes a substrate, a first reflective module, a first window cover, and a dual thermopile sensor. The first reflective module is disposed on the substrate, including a first mirror chamber with a narrow field of view (FOV), and the first reflective module focuses a thermal radiation from measured object to a first image plane in the first mirror chamber. The first window cover is disposed on the first reflective module, and the first window cover allows a selected band of the thermal radiation to pass through. The dual thermopile sensor is disposed on the substrate and located in the first mirror chamber, and the dual thermopile sensor senses a temperature data from the first image plane. Additional second reflective module, LED source plus pin hole with same FOV of dual thermopile sensor can illuminate the measured object for ease of placement of object to be heated.

12 Claims, 6 Drawing Sheets

TEMPERATURE SENSING DEVICE

FIELD OF THE INVENTION

The present disclosure relates to field of a temperature sensing device, in particular to a noncontact temperature sensor incorporated with thermopile sensor with thermal shock compensation plus narrow field of view properties.

BACKGROUND OF THE INVENTION

Smart appliance such as Microwave oven needs one non-contact temperature sensor that can be used to monitor food's surface temperature in order to control the heating power and duration in the operation of microwave oven.

Normal thermopile sensor has the deficiency that the temperature is not accurate enough due to the influence of quickly rising air temperature inside the microwave oven, which is called "thermal shock" effect. This is due to the thermopile sensor receives two inputs; one from external radiation of object under test, and another one from package cap of the thermopile sensor when cap temperature is not balanced with cold junction of thermopile sensor. Hence for accurate non-contact temperature measurement, the cap effect must be compensated to get accurate temperature reading of measured object.

An Infrared temperature sensor based on dual thermopile sensors is proposed to solve the problem of thermal shock effect for microwave oven application. One thermopile sensor (active sensor) is used to sense the temperature of heated object and another thermopile sensor (dummy sensor) is used to compensate the cap effect caused by air temperature perturbation inside the microwave oven.

Another issue of temperature sensing in microwave application is to place object to be heated under the field of view of the temperature sensing device, that uses invisible infrared light for detection. For ease of placement of object to be heated in the microwave oven, a visible illumination for the sensed area with the same field of view (FOV) of the temperature sensing device is required.

Hence there is a need for temperature sensing device with narrow field of view plus thermal shock compensation for accurate temperature measurement, and/or a tool set that can help user to locate the sensed area of object to be heated.

SUMMARY OF THE INVENTION

One objective of the present disclosure is to provide accurate temperature measurement device within a microwave oven by using a remote temperature sensing technology, incorporated with dual thermopile sensing elements to compensate the thermal shock effect caused by air temperature perturbation inside a microwave oven.

One of the thermopile sensing elements (for example, an active thermopile sensing element) is used to measure a thermal radiation of an object to be heated, and another one of the thermopile sensing elements (for example, a dummy sensing element) is used to measure the thermal radiation of sensor package and compensate for a thermal shock effect to provide accurate temperature measurement. In order to reduce the thermal shock effect of the package, a dual thermopile sensor is packaged within a surface mount device (SMD) to reduce the thermal radiation of the package.

To locate the center temperature of object to be heated, the thermopile sensor must have narrow field of view (e.g. <15 degrees) for microwave oven application. The present disclosure adopts a two optical elements design. The first optical element is a reflective mirror to provide the required narrow field of view, and the second optical element is a Fresnel lens to re-image the object after first optical element to a smaller active thermopile sensing element in order to improve the temperature resolution of an overall temperature sensor.

For ease of user to check and place food on a turntable in a microwave oven, the present disclosure adds a visual design by a second reflection module on the same substrate, which contains a visible light-emitting diode (LED) made of SMD. Emitted light from the light-emitting diodes passes through a reflecting mirror and then a pinhole on the second reflective module to simulate the same field of view as the dual thermopile sensor. Another embodiment of the illuminating light source is a visible laser diode and beam expander plus pin hole to mimic the field of view of infrared temperature sensor.

In order to achieve the objective of the present disclosure, the temperature sensing device includes a substrate, a first reflective module, a first window cover, and a dual thermopile sensor. The first reflective module is disposed on the substrate, including a first mirror chamber with a field of view (FOV), and focusing the thermal radiation of an object under measured to a first image plane in the first mirror chamber. The first window cover is disposed on the first reflective module, and allows a selected band of the thermal radiation of the measured object to pass through. The dual thermopile sensor is disposed on the substrate and located in the first mirror chamber. The dual thermopile sensor senses a temperature data from the first image plane, that includes a package cap, a Fresnel lens, and an application specific integrated circuit (ASIC) chip. The package cap includes a first window and a second window. The first window includes an opening hole. The second window is disposed adjacent to the first window. The Fresnel lens covers the opening hole, and re-images the first image plane to a second image plane. The ASIC chip is disposed in the package cap, and includes an active thermopile sensing element and a dummy sensing element. The active thermopile sensing element is located corresponding to the second image plane to sense the temperature data. The dummy sensing element is located corresponding to the second window and senses the thermal radiation from package cap.

In some embodiments, the first reflective module includes an elliptical shape mirror or a spherical shape mirror.

In some embodiments, the FOV of the first reflective module is less than 15 degrees.

In some embodiments, the first reflective module includes a first metallic coating on a first inner surface of the first reflective module.

In some embodiments, the first window cover includes an anti-reflection (AR) coating.

In some embodiments, the Fresnel lens includes an AR coating.

In some embodiments, the ASIC chip further includes a low noise amplifier, a multiplexer, an analog to digital converter (ADC), a nonvolatile memory, and a communication interface.

In some embodiments, the ADC is a high-resolution sigma-delta ADC.

In order to achieve the objective of the present disclosure, the temperature sensing device includes a substrate, a first reflective module, a first window cover, a dual thermopile sensor, a second reflective module, a second window cover, and a light-emitting diode (LED). The first reflective module is disposed on the substrate, including a first mirror chamber with a narrow field of view (FOV), and focusing a thermal radiation of an object under measurement to a first image plane in the first mirror chamber. The first window cover is disposed on the first reflective module, and allows a selected band of the thermal radiation to pass through. The dual thermopile sensor is disposed on the substrate and located in the first mirror chamber. The dual thermopile sensor senses a temperature data from the first image plane, and includes a package cap, a Fresnel lens, and an application specific integrated circuit (ASIC) chip. The package cap includes a first window and a second window. The first window includes an opening hole. The second window is disposed adjacent to the first window. The Fresnel lens covers the opening hole, and re-images the first image plane to a second image plane. The ASIC chip is disposed in the package cap, and includes an active thermopile sensing element and a dummy sensing element. The active thermopile sensing element is located corresponding to the second image plane to sense the temperature data. The dummy sensing element is located corresponding to the second window and senses a thermal radiation from package cap. The second reflective module is disposed on the substrate, including a second mirror chamber with the same FOV of the temperature sensor, and reflecting a light to the object emitted the thermal radiation. The second window cover is disposed on the second reflective module, and includes a pin hole to allow the light to pass through. The LED is disposed on the substrate and located in the second mirror chamber, and emits the light to the second reflective module.

In some embodiments, the second reflective module includes a plane mirror.

In some embodiments, the second reflective module includes a second metallic coating on a second inner surface of the second reflective module.

In some embodiments, the temperature sensing device further includes a beam expander. The beam expander is disposed adjacent to the pin hole, the LED includes a visible laser diode to emit a laser beam as the light to pass through the pin hole by the second reflective module and then the beam expander.

In summary, in order to solve the problem of the thermal shock effect due to the air temperature perturbation inside the microwave oven, the present disclosure provides the temperature sensing device with the dual thermopile sensor. The active thermopile sensing element is used to sense the temperature data of object to be heated (for example, foods) inside the microwave oven. The dummy sensing element is used to sense the thermal radiation from package cap, which is caused by the air temperature perturbation inside the microwave oven, for example, the rapid rising of an air temperature inside the microwave oven. The ASIC chip can get an accurate temperature measurement of the object by compensating the thermal shock effect from the thermal radiation of package cap.

It is worth mentioning that, in some embodiments, in order to locate a center temperature of the object, the dual thermopile sensor have a narrow FOV to fit a microwave oven appliance, for example, the FOV of the first reflective module is less than 15 degrees. For an installation of the dual thermopile sensor, a tool set for mapping the center of turn table in microwave oven may be required for end user to place the object.

Further, the temperature sensing device of the present disclosure may include a first reflective module and a second reflective module. The first reflective module is used to focus the thermal radiation from measured object to the first image plane in the first mirror chamber. The first reflective module is used to increase the sensitivity of the dual thermopile sensor to sense the temperature data as well as provide narrow view of view of the temperature sensor. The second reflective module includes the second mirror chamber with the same FOV as the first reflective module to reflect the light from the LED to illuminate a region for the measured object inside the microwave oven.

Therefore, compared with the related art, the present disclosure may compensate the thermal shock effect due to the air temperature perturbation inside the microwave oven to provide accurate temperature measurement. Meanwhile, the present disclosure adopts an optical design with a narrow FOV to accurately measure the surface temperature of the object without being affected by a background ambient temperature. The visual design added in the present disclosure makes it easier for the user to place food to be measured by the dual thermopile sensor.

In order to further understand the techniques, means, and effects of the present disclosure for achieving the intended object. Please refer to the following detailed description and drawings of the present disclosure. The drawings are provided for reference and description only, and are not intended to limit the present disclosure.

DETAILED DESCRIPTION OF ILLUSTRATIVE EMBODIMENTS

The following are specific examples to illustrate some implementations of the present disclosure. A person skilled in the art may understand the advantages and effects of the present disclosure from the content disclosed in this specification. The present disclosure may be implemented or applied through other different specific embodiments, and various details in this specification may also be based on different viewpoints and applications, and various modifications and changes may be made without departing from the concept of the present disclosure.

The technical content and detailed description of the present disclosure are described below with the drawings.

Figure 1:
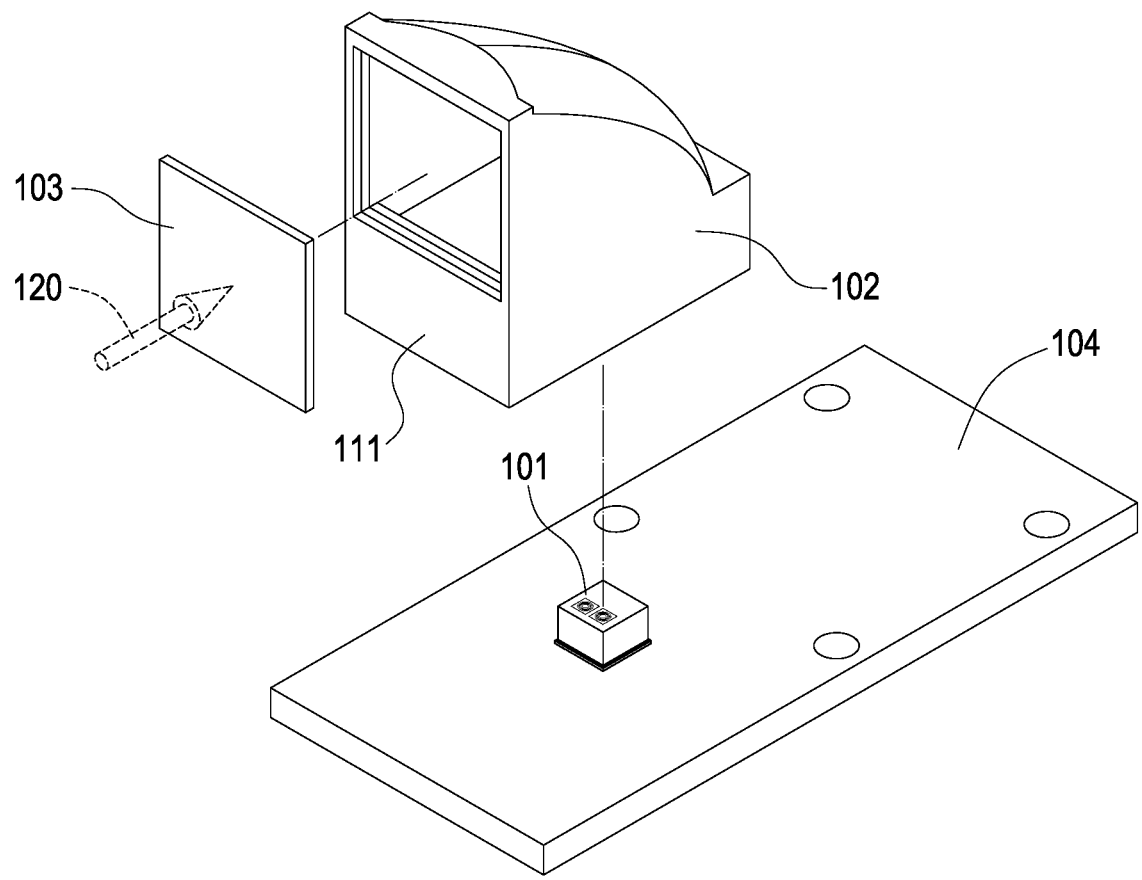
FIG. 1 is an exploded view of a first embodiment of a temperature sensing device of the present disclosure.
Figure 2:
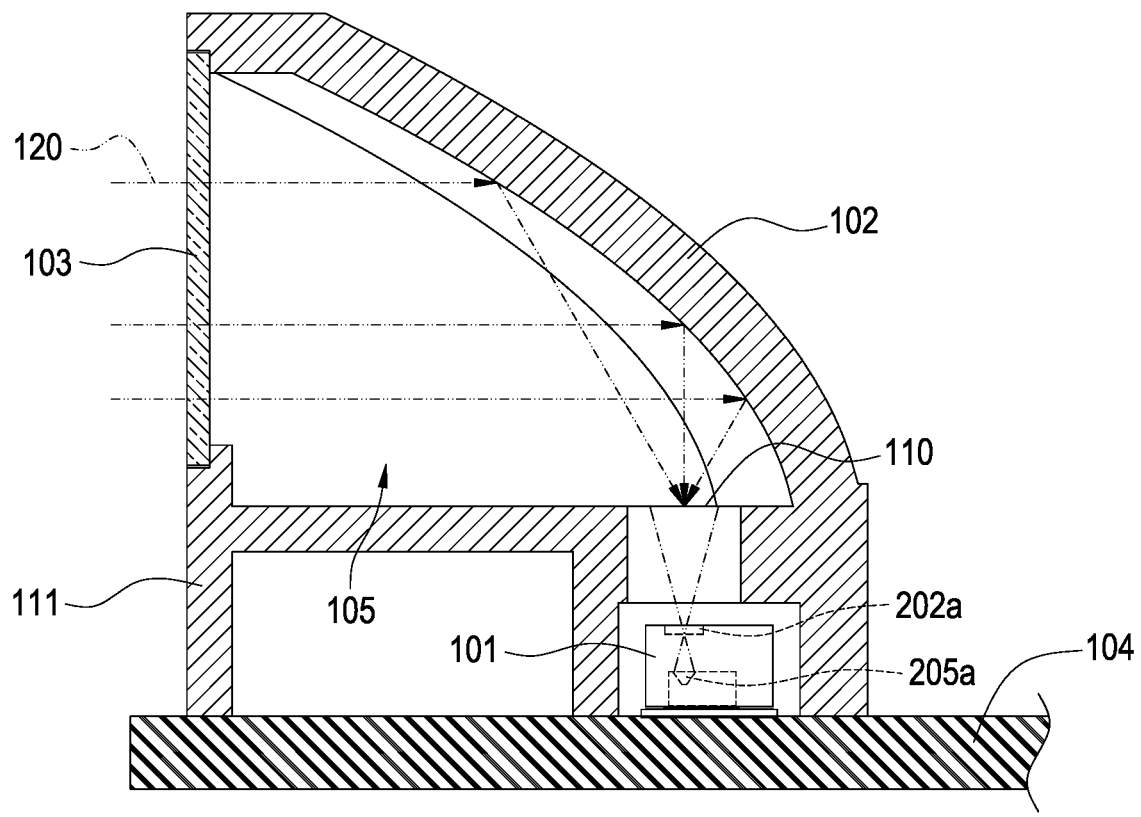
FIG. 2 is a schematic view of an optical path of a first reflective module of the first embodiment of the present disclosure.
Figure 3:
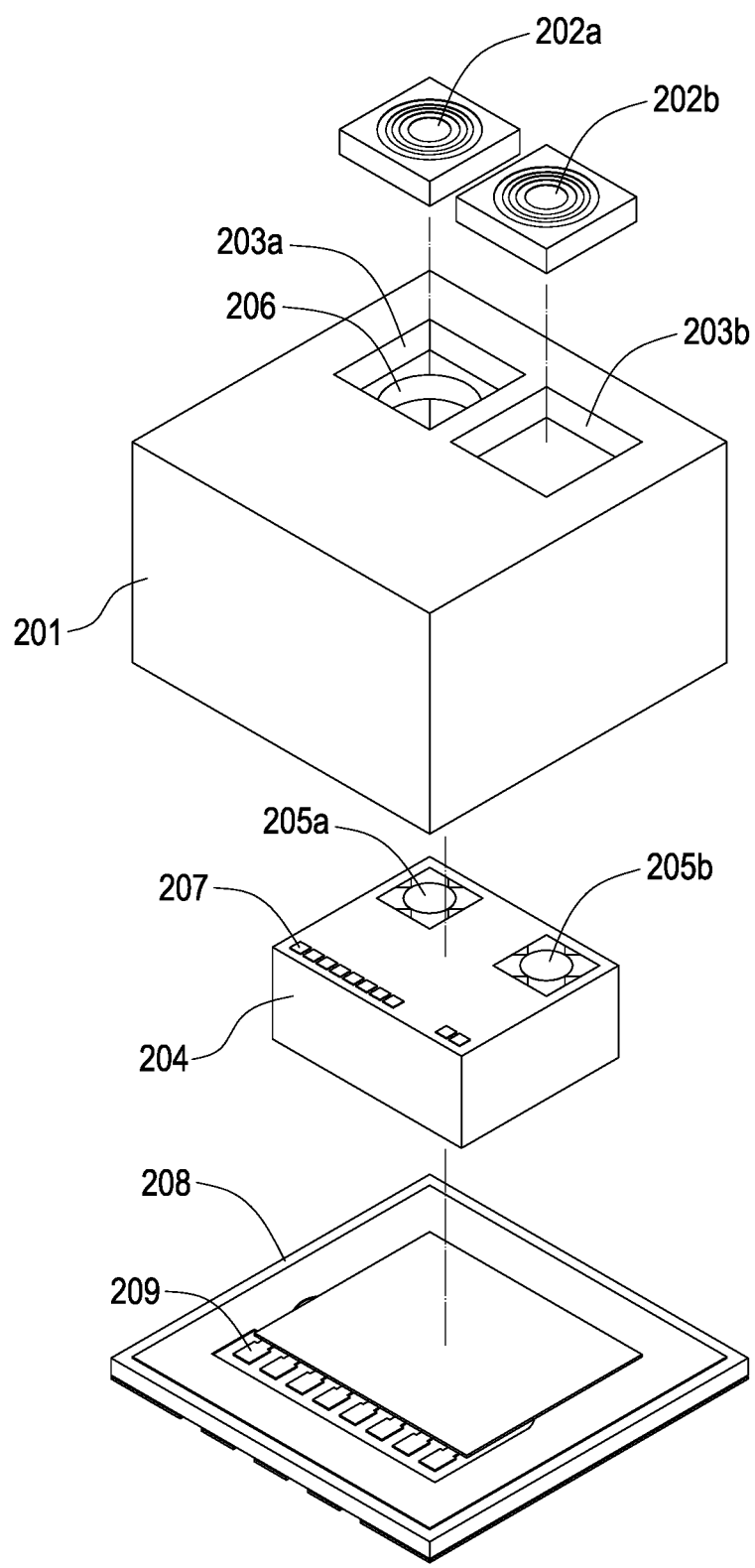
FIG. 3 is an exploded view of a dual thermopile sensor of the temperature sensing device of the present disclosure.

FIG. 1 is an exploded view of a first embodiment of a temperature sensing device of the present disclosure. FIG. 2 is a schematic view of an optical path of a first reflective module of the first embodiment of the present disclosure. FIG. 3 is an exploded view of a dual thermopile sensor of the temperature sensing device of the present disclosure.

As shown in FIG. 1 and FIG. 2, the temperature sensing device 1 of the present disclosure includes a substrate 104, a first reflective module 102, a first window cover 103, and a dual thermopile sensor 101.

The first reflective module 102 is disposed on the substrate 104, and includes a first mirror chamber 105 with a field of view (FOV). The first reflective module 102 focuses an infrared thermal radiation 120 to a first image plane 110 in the first mirror chamber 105.

In some embodiments, the first reflective module 102 includes an elliptical shape mirror or a spherical shape mirror. The first reflective module 102 is used to increase the received amount of infrared radiation into the dual thermopile sensor 101 and improve the sensitivity of the dual thermopile sensor 101 to sense an object's temperature, here is not intended to be limiting.

In some embodiments, the FOV of the first reflective module 102 is less than 15 degrees. Further, the first reflective module 102 may have a narrow FOV to fit a microwave oven appliance. The FOV may be between about 5 to about 10 degrees to provide a sensed area with a diameter of about 2 to about 4 cm. In some embodiments, the FOV is about 5 to about 7 degrees, here is not intended to be limiting.

In some embodiments, the first reflective module 102 includes a first metallic coating on a first inner surface of the first reflective module 102. Further, the first metallic coating may include a material of aluminum, gold, and/or Nichrome, etc., here is not intended to be limiting.

In some embodiments, a support portion 111 is molded with the first reflective module 102, and accommodates the first window cover 103, here is not intended to be limiting.

The first window cover 103 is disposed on the first reflective module 102, and allows a selected band of wavelength of the infrared thermal radiation 120 to pass through, the selected band may be between 5-14 μm, here is not intended to be limiting.

In some embodiments, the first window cover 103 is made with silicon material for passing the infrared thermal radiation 120, and protects the first reflective module 102. In some embodiments, the first window cover 103 may be a silicon window, here is not intended to be limiting.

In some embodiments, the first window cover 103 may include an anti-reflection (AR) coating to improve an infrared transmission coefficient and improve the transmission of the infrared thermal radiation 120 input to the first mirror chamber 105, here is not intended to be limiting.

As shown in FIG. 1 to FIG. 3, the dual thermopile sensor 101 may be in a surface mount device (SMD) package format, and disposed on the substrate 104 and located in the first mirror chamber 105. The dual thermopile sensor 101 is configured to sense a temperature data from the first image plane 110, and may include a substrate 208, a package cap 201, a Fresnel lens 202a, and an application specific integrated circuit (ASIC) chip 204.

In some embodiments, an external surface of the dual thermopile sensor 101 may be coated with a metallic coating to block unwanted scattered infrared signal. Similarly, an inner surface of the package cap 201 may be coated with metallic coating as well. Further, the first metallic coating may include the material of aluminum, gold, and/or Nichrome, etc., here is not intended to be limiting.

The substrate 208 includes pads 209 that may be wire bonded to bonding pads 207 of the ASIC chip 204, and the substrate 208 is used to provide input and output signals of the whole dual thermopile sensor 101, here is not intended to be limiting.

The package cap 201 includes a first window 203a and a second window 203b, the first window 203a includes an opening hole 206, and the second window 203b is disposed adjacent to the first window 203a. Further, the second window 203b is a blind window to host a silicon wafer dice 202b to match a thermal capacity for both thermopile sensors 205a and 205b for a cap effect (also known as a thermal shock effect).

In some embodiments, the silicon wafer dice 202b is optional, and the second window 203b may be disposed with another Fresnel lens, here is not intended to be limiting.

The Fresnel lens 202a covers the opening hole 206, and re-images the first image plane 110 to a second image plane. Further, the Fresnel lens 202a may be a silicon lens/filter to allow the infrared thermal radiation 120 to pass through, here is not intended to be limiting.

In some embodiments, the Fresnel lens 202a includes an AR coating to improve the infrared transmission coefficient and to improve the transmission of the infrared thermal radiation 120 input to the ASIC chip 204, here is not intended to be limiting.

The ASIC chip 204 is disposed in the package cap 201 and on the substrate 208, and the ASIC chip 204 includes an active thermopile sensing element 205a and a dummy sensing element 205b.

In some embodiments, the ASIC chip 204 includes the bonding pads 207, and the bonding pads 207 may be wire bonded to the pads 209 of the substrate 208 for input and output signals of the whole dual thermopile sensor 101, here is not intended to be limiting.

The active thermopile sensing element 205a is located corresponding to the second image plane to sense the temperature data.

In some embodiments, the active thermopile sensing element 205a is located at the second image plane and under the first window 203a. The active thermopile sensing element 205a is used to sense the temperature data of heated object (not shown in the figures) in the microwave oven, here is not intended to be limiting.

The dummy sensing element 205b is located corresponding to the second window 203b and senses thermal radiation from package cap 201.

In some embodiments, the dummy sensing element 205b is under the second window 203b, and is disposed side by side with the active thermopile sensing element 205a. The dummy sensing element 205b is used to sense the thermal radiation from package cap 201.

In some embodiments, the ASIC chip 204 may obtain an accurate temperature of the measured object by compensating the thermal shock effect caused by the thermal radiation from package cap.

It is worth mentioning that, due to rapid change of an ambient temperature, the package cap 201 may generate infrared thermal radiation 120 to the active thermopile sensing element 205a and the dummy sensing element 205b due to an unbalanced temperature between a cap temperature and a cold junction temperature of thermopile (for example, the active thermopile sensing element 205a). The cap temperature may create a pseudo thermal radiation that impacts the accuracy of remote temperature sensing, here is not intended to be limiting.

In some embodiments, the ASIC chip 204 calculates signal Va of an output from the active thermopile sensing element 205a and signal Vb of an output from the dummy sensing element 205b to obtain an actual temperature of the object. The actual received radiation signal is calculated by $Vt = Va - K*Vb$ with K as calibration factor used to compensate a sensitivity difference between two thermopile sensors 205a and 205b and the thermal shock effect (also known as a mismatched cap radiation effect or the cap effect) for both thermopile sensors 205a and 205b. Further, the actual received radiation signal Vt may be accurately corresponding to the temperature of the object, here is not intended to be limiting.

Figure 4:
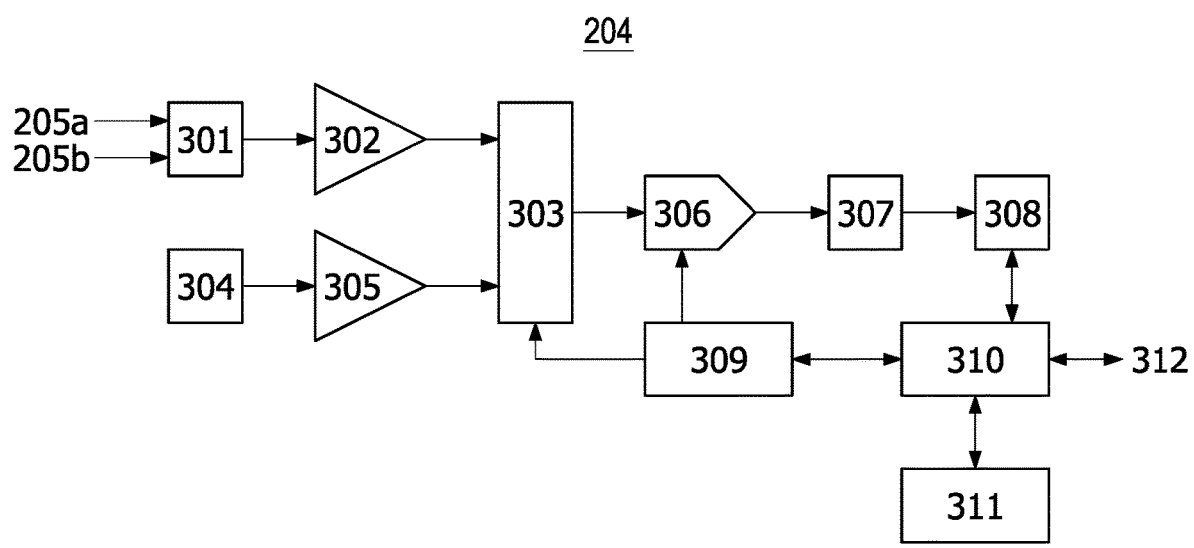
FIG. 4 is a block diagram of an ASIC chip of the temperature sensing device of the present disclosure.

FIG. 4 is a block diagram of an ASIC chip of the temperature sensing device of the present disclosure.

As shown in FIG. 4, the ASIC chip 204 integrates dual thermopile sensors 205a, 205b with readout electronics on the same silicon chip.

In some embodiments, the readout electronics include a low noise amplifier 302, a first multiplexer 301, a second multiplexer 303, an analog to digital converter (ADC) 306, a nonvolatile memory 311, and a communication interface 310. Further, the ADC 306 is a high-resolution sigma-delta ADC.

In some embodiments, thermopile signals from the active thermopile sensing element 205a and the dummy sensing element 205b pass through the first multiplexer 301 to the low noise amplifier 302, and then the thermopile signals are selected by the second multiplexer 303 before feeding to the ADC 306, here is not intended to be limiting.

In some embodiments, the ASIC chip 204 further includes an ambient temperature sensor 304. An ambient temperature signal is buffered by a buffer amplifier 305, and then the ambient temperature signal is selected by the second multiplexer 303 before feeding to the ADC 306, here is not intended to be limiting.

In some embodiments, a digital signal converted by the ADC 306 is filtered by a digital filter 307, and then the digital signal is stored in a register 308, here is not intended to be limiting.

In some embodiments, the communication interface 310 is used to read or write the register 308, and controls an operation of the ASIC chip 204, such as to select sensor signal, start of the ADC 306, and readout/storage of the nonvolatile memory 311 for calibration parameters, etc., here is not intended to be limiting.

In some embodiments, the communication interface 310 may include I²C interface, here is not intended to be limiting.

In some embodiments, the ASIC chip 204 further includes a state machine 309 (for example, a microcontroller) that is triggered by the communication interface 310 to select sensor channels, trigger an operation of the ADC 306, and store digital signal converted by the ADC 306 in register 308 or the nonvolatile memory 311, here is not intended to be limiting.

In some embodiments, the communication interface 310 may communicate with an external microcontroller (not shown in the figures) by an interface signal 312, here is not intended to be limiting.

Therefore, in order to solve the problem of the thermal shock effect due to the air temperature perturbation inside the microwave oven, the present disclosure provides the temperature sensing device 1 with the dual thermopile sensor 101. The active thermopile sensing element 205a is used to sense the temperature data of heated object (for example, foods) in the microwave oven. The dummy sensing element 205b is used to sense a thermal radiation from the package cap 201, and the package cap thermal radiation is caused by the air temperature perturbation inside the microwave oven, for example, the rapid rising of an air temperature inside the microwave oven. The ASIC chip 204 obtains the accurate temperature of the object by compensating the thermal shock effect with the temperature data and the package cap thermal radiation.

Figure 5:
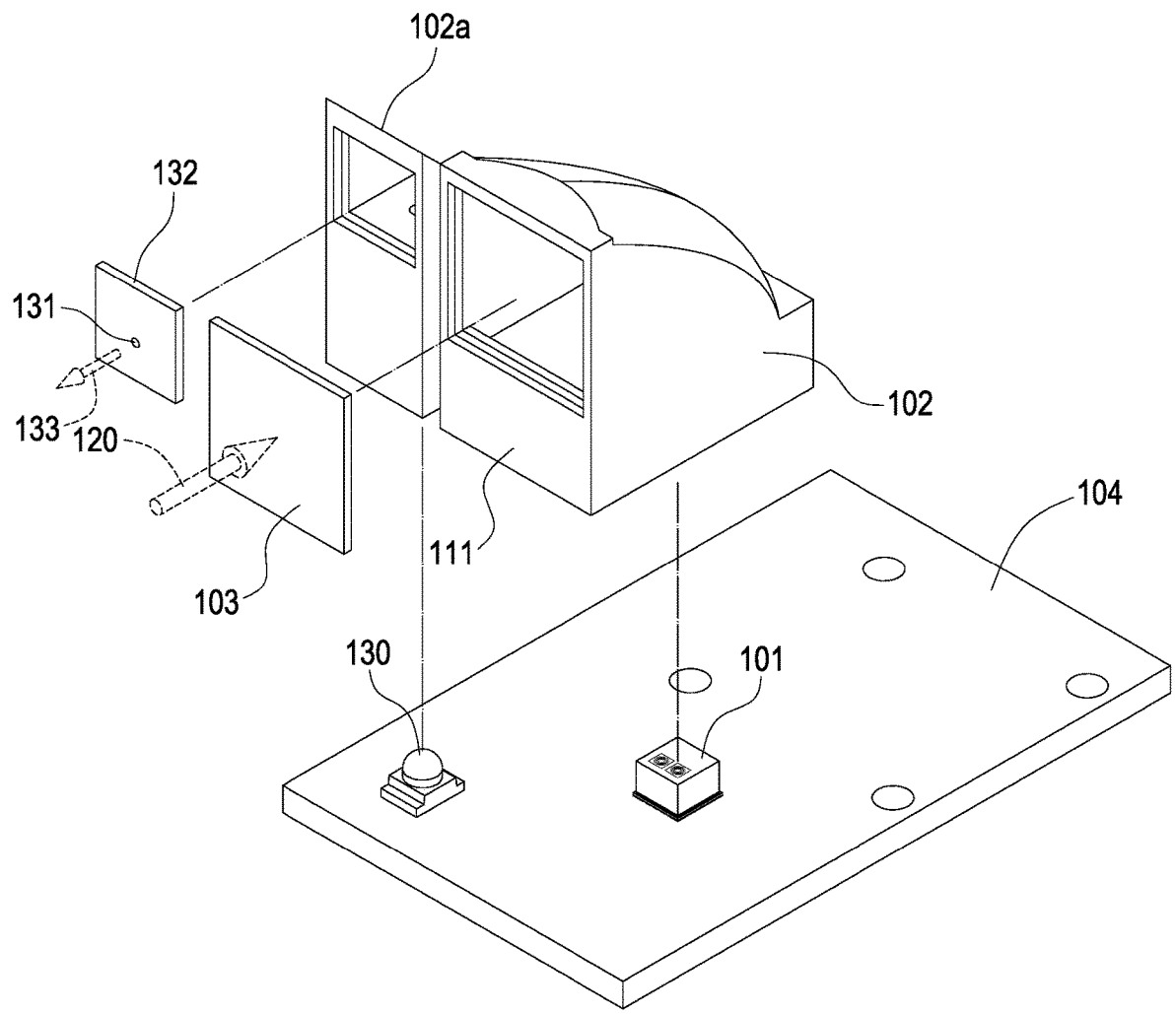
FIG. 5 is an exploded view of a second embodiment of the temperature sensing device of the present disclosure.

FIG. 5 is an explode view of a second embodiment of the temperature sensing device of the present disclosure which further includes a second reflective module 102a, a second window cover 132, and a light-emitting diode (LED) 130.

Figure 6:
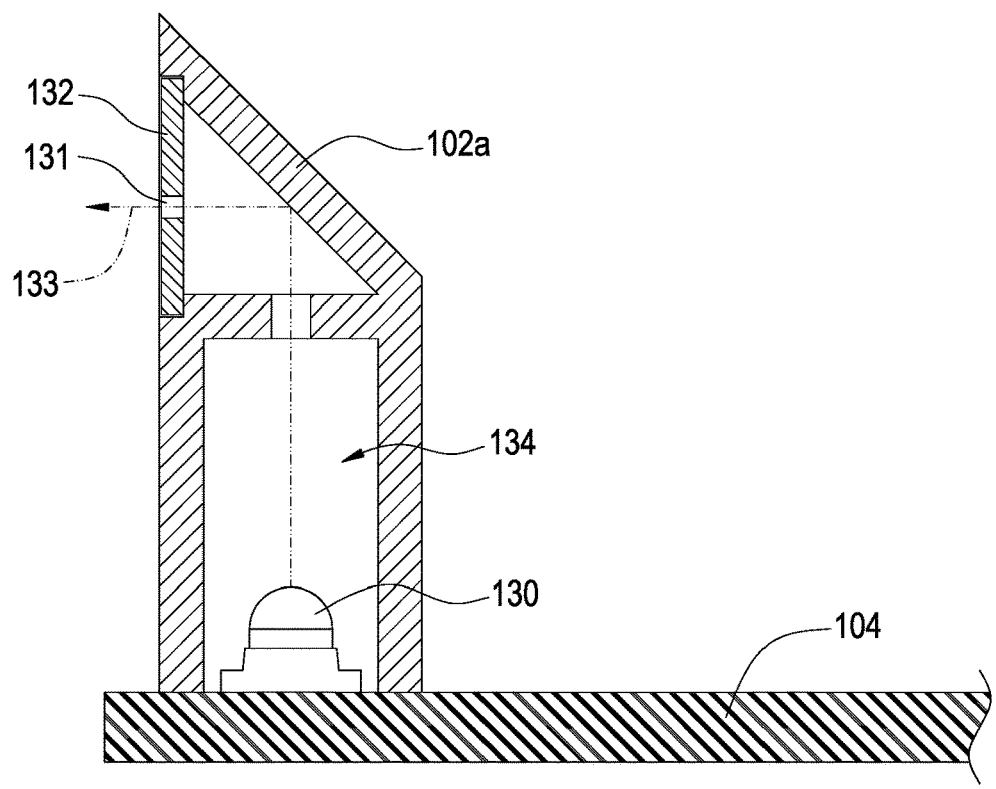
FIG. 6 is a schematic view of an optical path of a second reflective module of the second embodiment of the present disclosure.

FIG. 6 is a schematic view of an optical path of a second reflective module of the second embodiment of the present disclosure.

The second reflective module 102a, disposed on substrate 104, includes a second mirror chamber 134 with the same FOV as the first reflective module 102, and reflects a light beam 133 to the object emitted the infrared thermal radiation 120.

In some embodiments, the second reflective module 102a includes a second metallic coating on a second inner surface of the second reflective module 102a. Further, the second metallic coating may include a material of aluminum, gold, and/or Ni-chrome, etc., here is not intended to be limiting.

In some embodiments, the second reflective module 102a and the first reflective module 102 are injection molded at the same time with two separate chambers, here is not intended to be limiting.

The second window cover 132 is disposed on the second reflective module 102a, and includes a pin hole 131 to allow the light beam 133 to pass through.

In some embodiments, the second window cover 132 is not transparent, the pin hole 131 is used to limit the partial light 133 that exits from the pin hole 131 with the same FOV as the dual thermopile sensor 101, here is not intended to be limiting.

The SMD LED 130 is disposed on the substrate 104 by a SMT process. The emitted light beam 133 from SMD LED 130 is locates in the second mirror chamber 134 that is beam bended by the second reflective module 102a, and provides a visible illumination on the measured object, here is not intended to be limiting.

Figure 7:
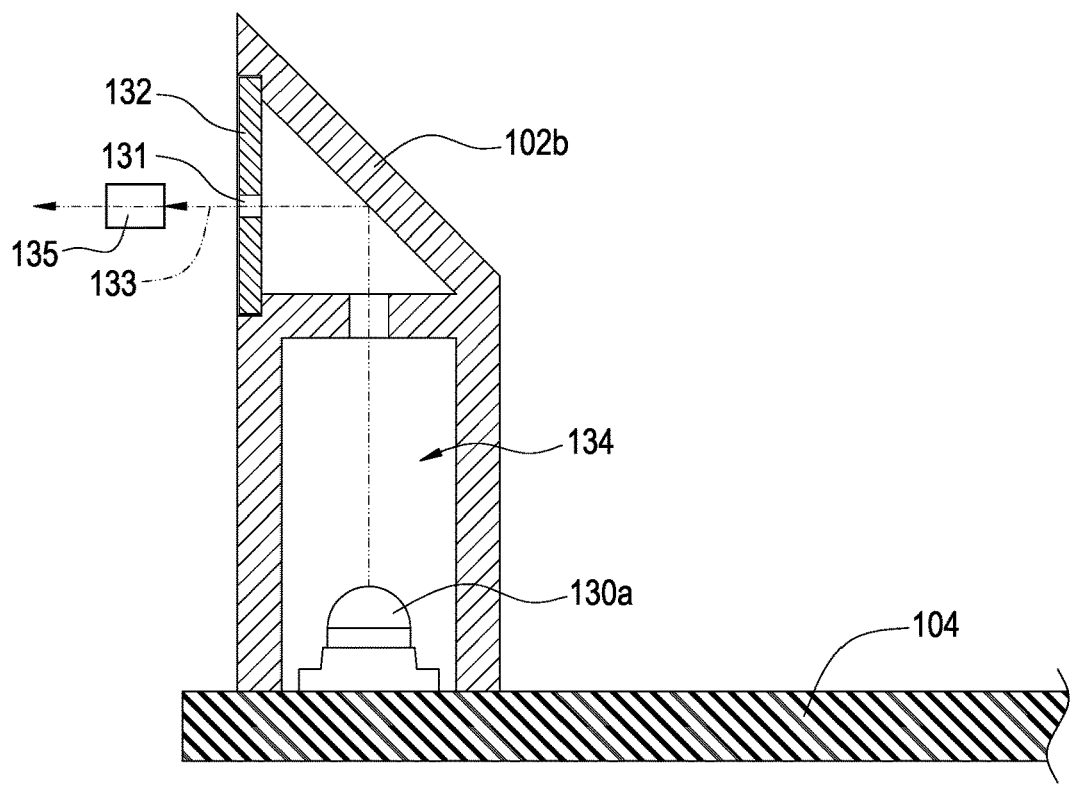
FIG. 7 is a schematic view of an optical path of a third reflective module of a third embodiment of the present disclosure.

FIG. 7 illustrates the optical path of another embodiment of the present disclosure that uses visible laser diode instead.

As shown in FIG. 7, the third reflective module 102b of the present disclosure is similar to the second reflective module 102a of the present disclosure, but the third reflective module 102b further includes a beam expander 135, and a visible laser diode 130a.

Firstly, the light beam 133 emitted from the visible laser diode 130a is bended by reflective module 102b and then is passed through pin hole 131 before feeding to beam expander 135 to illuminate the measured object which mimic the same field of view of thermopile sensor.

In summary, in order to solve the problem of the thermal shock effect due to the air temperature perturbation inside the microwave oven, the present disclosure provides the temperature sensing device with the dual thermopile sensor. The active thermopile sensing element is used to sense the temperature data of measured object (for example, foods) in the microwave oven. The dummy sensing element is used to sense the thermal radiation from package cap which is caused by the air temperature perturbation inside the microwave oven, (e.g. the rapid rising of an air temperature inside the microwave oven). By using dummy thermopile sensor as thermal shock compensation caused by cap radiation effect, the ASIC chip can get accurate temperature reading of measured object.

It is worth mentioning in some embodiments that a dual thermopile sensor with narrow FOV (e.g. FOV<15 degrees) plus illuminating light beam is used in microwave oven to locate the measured object, here is not intended to be limiting.

Further, the temperature sensing device of the present disclosure may include a first reflective module and a second reflective module. To increase the temperature sensitivity of the dual thermopile sensor, a first reflective module is used to focus the thermal radiation from measured object to the first image plane inside the first mirror chamber and then refocus to active thermopile element by second Fresnel lens on dual thermopile sensor. To illuminate the measured object, a second reflective module consists of LED and pin hole that has the same FOV of the thermopile sensor Therefore, compared with the related art, the present disclosure may compensate the thermal shock effect due to the air temperature perturbation inside the microwave oven to provide accurate temperature measurement. Meanwhile, the present disclosure adopts an optical design with a narrow FOV to accurately measure the surface temperature of the object without being affected by a background ambient temperature. The added illuminating design in the present disclosure provides user ease of placement of object to be heated.

The above is only a detailed description and drawings of the preferred embodiments of the present disclosure, but the features of the present disclosure are not limited thereto, and are not intended to limit the present disclosure. All the scope of the present disclosure shall be subjected to the scope of the following claims. The embodiments of the spirit of the present disclosure and its similar variations are intended to be included in the scope of the present disclosure. Any variation or modification that may be easily conceived by those skilled in the art and in the field of the present disclosure may be covered by the following claims.

What is claimed is:

1. A temperature sensing device, comprising:
   a substrate, hosting a dual thermopile sensor and a reflective module;
   a first reflective module, disposed on the substrate, comprising a reflective surface and a first mirror chamber with a field of view (FOV), and focusing a thermal radiation from the measured object to a first image plane in the first mirror chamber;
   a first window cover, disposed on the first reflective module, and allowing a selected band of the thermal radiation to pass through; and
   a dual thermopile sensor, disposed on the substrate and located in the first mirror chamber, and sensing a temperature data from the first image plane, the dual thermopile sensor comprising:
   a package cap, comprising a first window and a second window, the first window comprising an opening hole, and the second window disposed adjacent to the first window;
   a Fresnel lens, covering the opening hole, and re-imaging the first image plane to a second image plane; and
   an application specific integrated circuit (ASIC) chip, disposed in the package cap, comprising an active thermopile sensing element and a dummy sensing element, the active thermopile sensing element located corresponding to the second image plane to sense the temperature data, and the dummy sensing element located corresponding to the second window and sensing a thermal radiation from inside of package cap.

2. The temperature sensing device of claim 1, wherein the first reflective module comprises an elliptical shape mirror or a spherical shape mirror.

3. The temperature sensing device of claim 1, wherein the FOV of the first reflective module is less than 15 degrees.

4. The temperature sensing device of claim 1, wherein the first reflective module comprises a first metallic coating on a first inner surface of the first reflective module.

5. The temperature sensing device of claim 1, wherein the first window cover comprises an anti-reflection (AR) coating.

6. The temperature sensing device of claim 1, wherein the Fresnel lens comprises an AR coating.

7. The temperature sensing device of claim 1, wherein the ASIC chip further comprises a low noise amplifier, a multiplexer, an analog to digital converter (ADC), a nonvolatile memory, and a communication interface.

8. The temperature sensing device of claim 7, wherein the ADC is a high-resolution sigma-delta ADC.

9. A temperature sensing device, comprising:
   a substrate that hosts a dual thermopile sensor and a reflective module;
   a first reflective module, disposed on the substrate, comprising a reflective surface and a first mirror chamber with a field of view, and focusing a thermal radiation a from the measured object to a first image plane in the first mirror chamber;
   a first window cover, disposed on the first reflective module, and allowing a selected band of the thermal radiation to pass through;
   a dual thermopile sensor, disposed on the substrate and located in the first mirror chamber, and sensing a temperature data from the first image plane, the dual thermopile sensor comprising:
   a package cap, comprising a first window and a second window, the first window comprising an opening hole, and the second window disposed adjacent to the first window;
   a Fresnel lens, covering the opening hole, and re-imaging the first image plane to a second image plane; and
   an application specific integrated circuit (ASIC) chip, disposed in the package cap, comprising an active thermopile sensing element and a dummy sensing element, the active thermopile sensing element located corresponding to the second image plane to sense the temperature data, and the dummy sensing element located corresponding to the second window and sensing a thermal radiation from inside of package cap,
   a second reflective module, disposed on the substrate, comprising a second mirror chamber with the FOV, and reflecting a light beam to the measured object that emits the thermal radiation;
   a second window cover, disposed on the second reflective module, and comprising a pin hole to allow the light beam to pass through; and
   a light-emitting diode (LED), disposed on the substrate and located in the second mirror chamber, and emitting the light to the second reflective module.

10. The temperature sensing device of claim 9, wherein the second reflective module comprises a plane mirror.

11. The temperature sensing device of claim 9, wherein the second reflective module comprises a second metallic coating on a second inner surface of the second reflective module.

12. The temperature sensing device of claim 9, further comprising:
   a beam expander, disposed adjacent to the pin hole, the LED comprising a visible laser diode to emit a laser beam as the light to pass through the pin hole and then beam expander by the second reflective module.

* * * * *